Feb. 4, 1969   J. N. MARTIN, JR   3,425,364
ROTATING SHELF OVEN
Filed May 1, 1967   Sheet 1 of 2

James N. Martin, Jr.
INVENTOR

BY Arnold, Roylance
Kruger & Docker
ATTORNEYS

Feb. 4, 1969   J. N. MARTIN, JR   3,425,364
ROTATING SHELF OVEN
Filed May 1, 1967   Sheet 2 of 2

James N. Martin, Jr.
INVENTOR

BY Arnold, Roylance
Kruger & Durkee
ATTORNEYS 3,425,364
ROTATING SHELF OVEN
James N. Martin, Jr., 214 Highview,
San Antonio, Tex. 78228
Filed May 1, 1967, Ser. No. 634,959
U.S. Cl. 107—60                    13 Claims
Int. Cl. A21b 1/26; F27b 9/16

ABSTRACT OF THE DISCLOSURE

A rotating shelf or carrousel oven suitable for baking of foodstuffs and particularly adaptable for use in commercial establishments, comprises a plurality of rotatable shelves disposed in a heat insulated zone on a rotatable flue tube. The gas flow in the oven is established such that hot gases generated in the bottom of the heat insulated zone travel upwardly along the peripheral walls of the oven and downwardly proximate the flue tube. The spent gases enter the flue tube below the lowermost shelf and are exhausted. To provide uniform temperature on all shelves and to establish this heat flow pattern, an insulative baffle or shield is provided on the bottom of the lowermost shelf.

Background of the invention

The instant invention relates to a novel construction for baking ovens. More particularly, the instant invention provides a novel oven having rotating horizontal shelves which is particularly adapted for use in commercial food establishments which oven provides an efficient flow of hot gases through the oven volume and which also provides uniform temperature on each of a plurality of shelves in the oven.

The requirements for a commercial oven of size and uniform heat distribution present problems to the design of such devices as opposed to ovens customarily employed in the home. Furthermore, it is apparent that the oven cannot be merely increased in size to accommodate a commercial capacity since mere enlarging of an oven deprives the user of access to the back portions of the heated zones and accordingly would cause difficulty in the placement and removal of material in the oven. Accordingly, several varying designs have evolved for commercial ovens, among them, the "Ferris wheel" design wherein a series of trays extended from a vertical spider wheel are made to rotate in the heated zone and at one portion of their travel are brought proximate an oven door through which the user might place or remove items to and from the oven. This design at once provides both a degree of accessibility and uniform heating. The foodstuffs in the oven are periodically brought right before the oven door, and moreover, the movement of the food through the oven ensures that although the temperature in the oven might not be uniform in the oven, that all the food is passing through all the various temperature zones which might be present in the oven, and consequently, all food is being baked at the same oven temperatures.

Although the Ferris wheel ovens do provide somewhat of a solution to commercial baking problems, it can be appreciated that such units are often large and very bulky, and consequently, often more expensive than commercial establishments of moderate size might wish to procure.

This design also has disadvantages in that the product being baked is out of sight for the major portion of the baking cycle. Structurally, each shelf must be swivel mounted to remain level and yet be stable, and accordingly, expense of such construction can be appreciated.

Ovens of moderate size may be conveniently made in the carrousel design which involves the rotation of a series of horizontally disposed shelves about a vertical axis. However, in such ovens, it is inherent that the food as it is being baked on each shelf constantly remains at a single level in the oven. Accordingly, the problem of uniform temperature on the shelves in such ovens presents a considerable problem often requiring the user to restrict baking to the upper several shelves and to use the lowermost shelf or shelves to effectively act as heat barriers. This, of course, results in considerable wasted volume in the oven, and accordingly, unnecessarily decreases the effective baking capacity of such ovens.

Summary of the invention

The oven in accordance with this invention is useful and desirable in the baking of foodstuffs; however, it will be understood that though reference to this use is predominant that the novel oven of this invention may also be employed in other operations such as smoking, dehydrating and the like. Furthermore, utility of the oven of this invention is not restricted to foodstuffs but may be employed as high temperature curing ovens for ceramics or the like.

There is accordingly provided by the instant invention a carrousel type oven wherein a number of horizontally disposed shelves are mounted in a heat insulated zone on a rotating flue tube and wherein the lowermost shelf is equipped with an insulative shield which has the effect of establishing an efficient heat flow through the oven and maintaining the shelves at uniform temperature. In the oven of the instant invention, hot gases generated in the bottom portion of a heat insulated zone flow upwardly and are channeled past an insulative shield on the lowermost shelf in the oven, the freshly heated gas then ascends in the oven close to the walls of the oven to the top of the heat insulated zone. The heat flow then proceeds downwardly proximate the flue tube mounted in the middle of the oven to an exhaust gas port in the flue tube below the lowermost shelf in the oven and above the insulative baffle or shield. The center rotating flue tube creates a natural draft upwardly in the tube. This in turn induces a downward circulation of hot gases proximate the center of the oven around the flue tube. There is established in the novel oven of this invention an efficient and circulating heat flow which serves to maintain uniform temperature throughout the oven without the generation of hot spots in the oven volume.

The novel oven of the instant invention may be conveniently and efficiently constructed employing sandwich type walls defining a cylindrical heating zone in which round shelves are disposed. The cylindrical design of the heat zone in the oven of this invention eliminates the occurrence of "hot corners" in the heated zone. Furthermore, the cylindrical walls contribute strength without supplemental bracing and provide a design where material distortion of the oven resulting from expansion and contraction of metal of the oven during use is largely eliminated.

The instant oven of this invention accordingly comprises an insulative enclosure defining a heat insulated zone and a means for generating hot gases in the lower portions of the insulated zone, a rotatable flue tube mounted vertically in the heat insulated zone supporting a plurality of rotatable shelves, the lowermost shelf having an insulative shield extending from the outer edges of the shelf to the flue tube to establish the desired gas flow and to maintain the lowermost shelf at a temperature substantially the same as the temperature on the upper shelves. The shelves are so mounted on the flue tube to provide a gas passageway proximate the flue tube past or through the shelves, and accordingly, the shelves are conveniently constructed of expanded metal or wire mesh at least in the region proximate the flue tube. As will be pointed out, the shelves may be sheet material, e.g., transite or steel with an open circulation passage proximate the flue tube. This enables the establishment in the oven of a circulating gas flow whereby the freshly heated hot gas travels upwardly around the periphery of the heat insulated zone and returns to exhaust downwardly in the middle of the heat insulated zone proximate the flue tube whereafter it travels up through the flue tube induced by the natural draft to an atmospheric or other exhaust.

The instant invention will be more particularly understood with specific reference to the accompanying drawings which illustrate a novel oven of this invention in one particular embodiment.

Description of specific embodiments

Figures 1, 5:
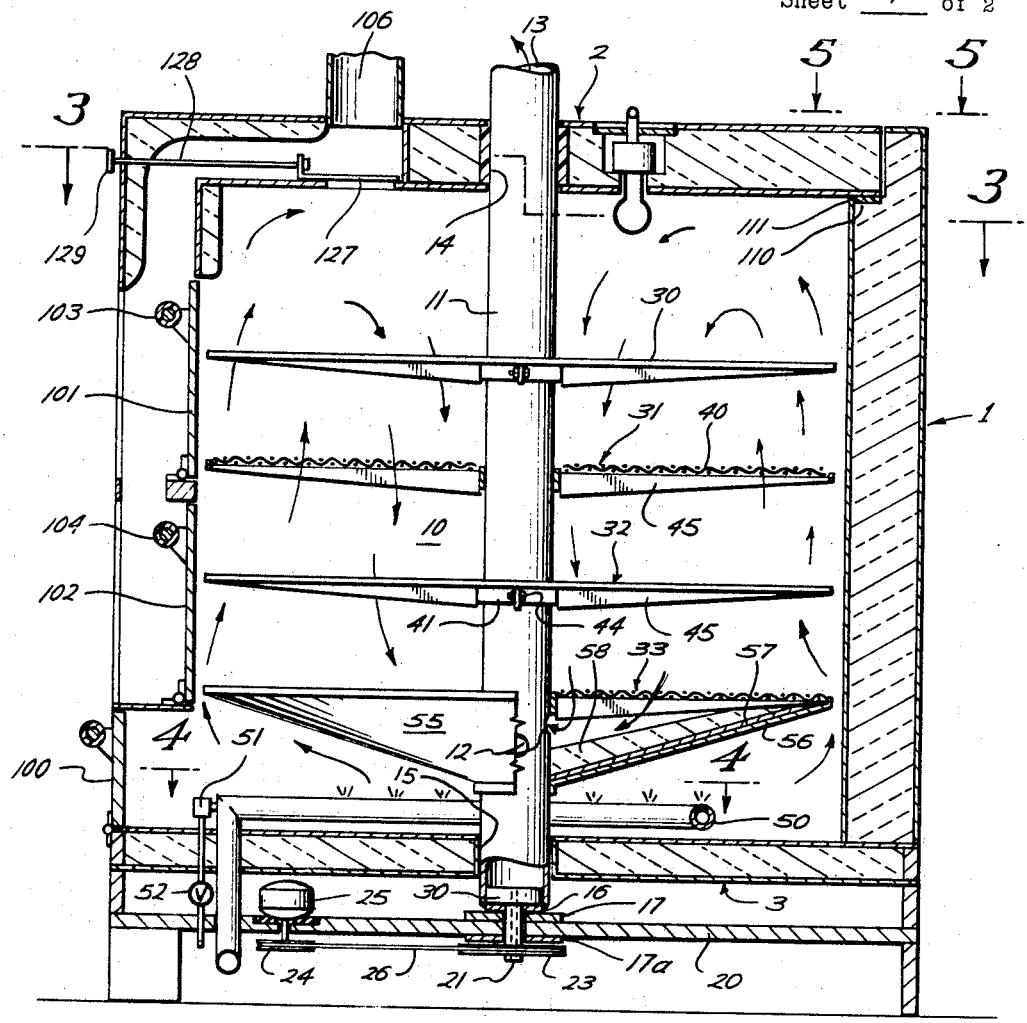
FIGURE 1 is a side plan view sectional elevation of a novel oven of this invention showing the insulative shield on the lowermost shelf in partial section.
FIGURE 5 is a detailed view taken on line 5—5 of FIG. 1 showing a locking device which may be employed to hold together the insulative walls of an oven in accordance with this invention.
Figure 2:
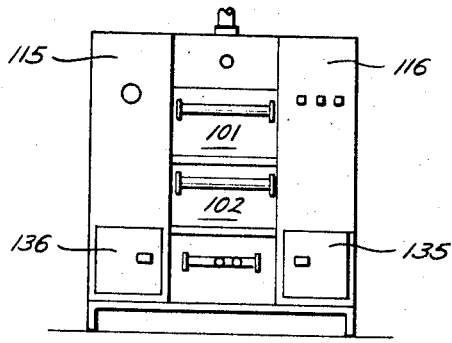
FIGURE 2 is a front elevational view of an oven in accordance with this invention showing the position of the doors and the general appearance of the device.
Figure 3:
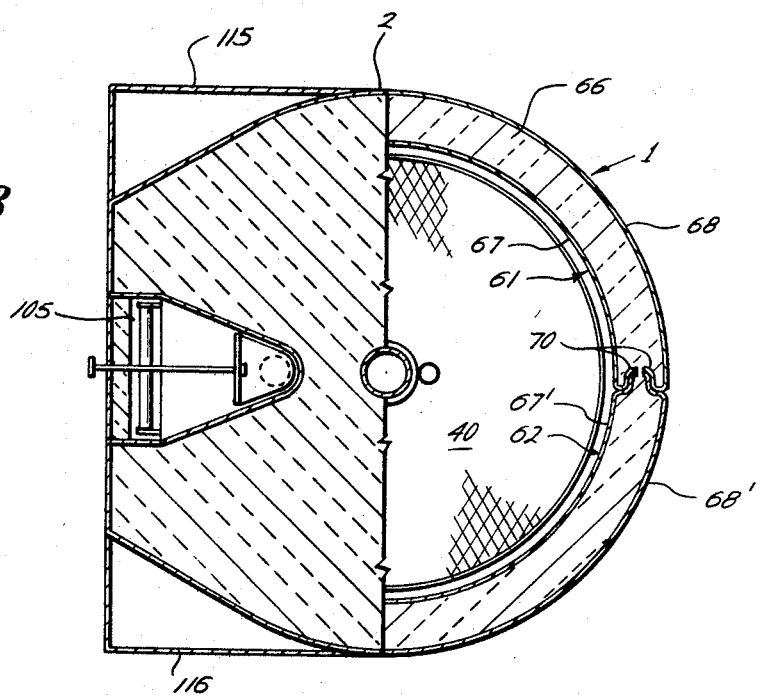
FIGURE 3 is a sectional view taken along line 3—3 in FIGURE 1.

With specific reference to the drawings, FIGURE 1 illustrates the novel "carrousel" type of oven in accordance with the invention. Vertical heat insulating wall 1 and top and bottom heat insulating closure members 2 and 3 enclose a substantially cylindrical heated baking zone 10. In FIGURE 3, the vertical wall member 1 is shown as conveniently assuming a substantially curved shape to effectively accommodate the circular shelves in the oven as hereinafter discussed. It should be noted, and shall be discussed more fully hereinafter that the heated baking zone is not completely cylindrical but that the frontal portion thereof comprises a flat wall wherein access doors 101 and 102 and clean out door 100 to the oven are placed. Clean out door 100 gives access to the lower part of the oven apparatus to enable cleaning of matter falling to the bottom of the oven and the like.

Centrally disposed within the heated zone 10 is flue tube 11 which is adapted to be rotated in the heated zone. Flue tube 11 is a hollow tubelike member provided with exhaust inlet ports 12 in the lower portion thereof. The upper opening of the tube 13 is adapted to exhaust hot gas to the atmosphere or to a suitable exhaust system. It should be noted that exhaust ports 12 in the lower portion of flue tube 11 are somewhat offset in their design, the ports on the side of the tube being disposed above the port on the front of the tube as illustrated (and on the reverse side of the tube). This arrangement of inlet ports is merely for purposes of avoiding an excessive weakening of the flue tube which is a weight bearing member as will be hereinafter discussed. The upper portion of the flue tube 11 extends through top closure member 2 and is suitably gasketed, bearinged, and sealed at 14 with a high temperature gasket material to prevent heat leakage through the seal and to lubricate for rotative movement through the flue tube. Mineral fiber impregnated with graphite or a fluorocarbon polymer such as that marketed under the trademark "Teflon" has been found to be suitable as the sealing material.

The flue tube likewise extends through bottom closure member 3 and is provided with a seal at 15 to prevent heat leakage. Of course, the heat leakage problem at the bottom of the heated zone 10 is not as serious as at the upper seal 14. Below bottom closure member 3, the lower portion of the flue tube forms a shoulder 16 which rests upon a bearing 17 which in turn is supported by the oven base 20. Another bearing such as ball or roller bearing mounted in a flange 17a is disposed around drive shaft 21 affixed to flue tube 11 below floor 20. Bearings 17 and 21 are also suitably a high temperature graphite material, a fluorocarbon polymer, or the like. Extending downwardly from the tube shoulders 16 is a driving shaft 21 on which there is mounted belt wheel 23. Driving shaft 21 is a hollow pipe or the like which is rigidly mounted to the flue tube shoulder 16 as by welding or another suitable method. The hollow nature of the drive shaft 21 enables the flue tube to draw in cool rambient air through the flue tube 11 when the furnace is in operation. This air cooling prevents conducted heat through the flue tube from unduly heating the bearings 17 and 17a and the lower portions of the flue tube mounted below the heated zone. Insulation 30 at the lower portion of flue tube 11 also serves to prevent overheating of bearings 17 and 17a, pulley 23, and shaft 21.

Belt wheel 23 is mounted on the drive shaft 21 and forms part of a V-belt drive mechanism. A chain drive might be used if desired. Belt 26 around wheel 23 is driven from wheel 24 on motor 25, for example, a gear head motor, which is rigidly mounted to the oven base 20. Commonly, wheel 23 is larger than wheel 24 to provide suitable speed reduction to wheel 24. Typically, ovens in accordance with this invention are operated at rotative speeds from about two to six or more revolutions per minute, thus bringing the product being baked into view frequently. Accordingly, it can be appreciated that the carrousel design offers a clear advantage over Ferris wheel type ovens which bring each product to the access door only once in a cycle as long as four minutes.

Flue tube 11 also serves as a mounting post for shelves 30, 31, 32 and 33 in heated zone 10. Any practical number of shelves may be provided. The flue tube 11 is therefore called upon to bear considerable weight including the weight of the shelves themselves as well as the weight of the items to be baked thereon. In the illustrated embodiment, each shelf is constructed of a screenlike support surface such as illustrated at 40 supported by gussets 45 extending radially outward from collar 41 which is mounted to flue tube 11. Any suitable method of mounting the shelves may be employed. It is preferred that the shelves be adjustable and accordingly a convenient mounting method may be provided wherein collars 41 are tightened around flue tube 11 by means of bolts such as at 44. The support surface 40 for the shelves is a screen-like, rigid wire mesh such as illustrated in FIGURE 1, or alternatively, the support surface may be constructed from expanded metal or the like. This preferred design enables the heat to travel upwardly through the shelves and accordingly, each shelf does not represent a significant barrier to passage and circulation of heat. Moreover, the screenlike support surface clearly enables the downward flow of heat proximate flue tube 11 which is desirably established in the novel ovens of this invention once operation is begun. If it is desired to use a solid sheet material for the support surfaces of shelves 30 to 33, there should nonetheless be provided an unimpeded gas path for the downwardly traveling gas proximate the flue tube. Thus, if solid shelves are employed, it is highly preferred that expanded metal or mesh be employed for that portion of the shelf proximate the flue tube. Alternatively, the shelf surface can be terminated a predetermined distance from the flue tube thus leaving an open space in that area. Of course, it will be appreciated that in such a design where expanded metal or mesh is not extended completely inwardly to flue tube 11, there is a danger that items on the shelf could be inadvertently pushed inwardly and caused to fall through the space. The establishment of the circulating heat flow through the novel oven of this invention will be further discussed hereinbelow.

Figure 4:
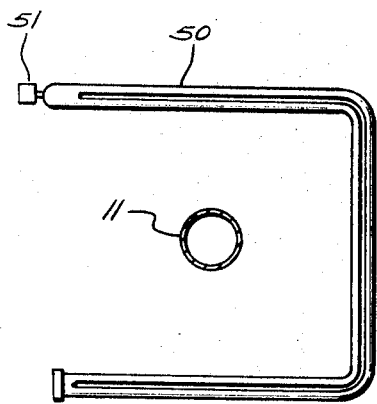
FIGURE 4 shows the ribbon burner employed to generate hot gas in accordance with this invention from a view taken along line 4—4 of FIGURE 1.

In the bottom portion of heated zone 10, there is provided ribbon burner 50 shown in greater detail in FIGURE 4. Ribbon burner 50 comprises a three-sided gas burner which encircles flue tube 11 in the bottom of heated zone 10. A suitable thermostatic pilot and thermocouple unit 51 is provided on the burner to light the gas from burner 50 and to operate with valve 52 to shut off gas supply in the event the pilot has been extinguished. Ribbon burner 50 is a conventional apparatus and indeed in place of the three-sided burner illustrated, any desired circular or other suitable safety controlled heat generating apparatus, preferably of the hot gas generating type, may be employed.

Immediately above the ribbon burner 50 and below the lowermost shelf 33 is disposed in insulative shield 55. Insulative shield 55 comprises an outer skin 56 of sheet metal or the like disposed as an inverted frustocone and extending from flue tube 11 to the outward edges of lowermost shelf 33. Sheet metal skin 56 may be suitably provided in two halves for securing around flue tube 11 by means of a bolt or like connection. Immediately above the sheet metal skin 56 is provided a radiant heat reflector 57 such as an aluminum foil sheet or the like extending over substantially the entire surface of sheet metal shield 56. In turn, above reflective insulator 57 there is provided a layer of cellular heat insulating material 58 such as rock wool or the like.

The providing of an insulative shield or baffle below lowermost shelf 33 serves to both enable maintenance of uniform temperature throughout the oven and also serves to establish an efficient and regular pattern of heat flow through the oven. By virtue of the proximity of the lowermost shelf to the ribbon burner in the bottom of heated zone 10, it has been found that in virtually any design the lowermost shelf will assume a temperature higher than any of the higher shelves. Despite the fact that the hot gas circulation through the oven is maintained and serves to uniformly heat the entire oven, the lowermost shelf will inevitably absorb the largest part of the radiant energy generated by the burners. Accordingly, as the oven remains in operation, the absorption of radiant energy by the lowermost shelf causes its temperature to slowly rise until it is considerably hotter than the higher shelves even though excellent circulation of the hot gas is maintained.

Furthermore, the insulative shield or baffle on the lowermost shelf in the novel oven of this invention serves to establish a flow of hot gas upwardly in the outer portions of the oven and downwardly in the central area of the oven proximate the flue tube. Despite the fact that up to the upper shelves may be of mesh or expanded metal material such that they represent no barrier to the passage of hot gases, the initial baffle effect of insulative baffle 55 serves to establish a hot air flow such as illustrated by the arrows in FIGURE 1. As will be noted in FIGURE 1, the hot gas flows outwardly beyond the edge of the lowermost shelf 33 and insulative shield 55 and proceeds upwardly in the outer portion of heated zone 10. The hot gases then return downwardly proximate flue tube 11 to gas exhaust inlet ports 12 which are located below bottom shelf 33 but above insulative baffle 55. Thus, insulative baffle 55 also serves as an effective baffle preventing short circuited hot gas flow directly from the ribbon burner to the inlet exhaust ports 12. Gas is forced to flow through the entire oven eliminating the generation of hot spots providing effective uniform heating for all shelves.

Vertical wall member 1 surrounds the entire heating zone 10 of the oven except the frontal portion where access doors 101 and 102 and clean out door 100 are located. As most clearly shown in FIGURE 3, vertical wall member 1 is essentially cylindrical in cross section, thus most easily accommodating the circular shelves with minimum wasted space. Two curved portions 61 and 62 joined at 65 from vertical wall member 1. Conveniently, members 61 and 62 are constructed from two pieces of sheet metal material enclosing a layer of cellular heat insulating material 66. Rock wool, plastic foam, or like material may be employed as the cellular insulator. If desired, inner metallic sheets 67 and 67' and outer metallic sheets 68 and 68' of members 61 and 62, respectively, can be preformed and cemented to the insulating material to provide a modular wall unit. There is accordingly provided a modular construction member which facilitates assembly of the oven. Of course, the entire vertical wall member may be constructed in any other suitable manner, for example, from two large pieces of sheet metal to form one continuous inner sheet and one continuous outer sheet enclosing an insulative layer. However, it can be appreciated that the size of the sheets in such an instance would be unwieldy and accordingly more difficult and less economical to produce.

It should be noted that the outer metallic sheets 68 and 68' of members 61 and 62 are entirely insulated from the inner wall members 67 and 67' which face in the heated baking zone 10. Joinder of members 61 and 62 is accordingly effected by providing a tongue-in-groove construction of the metallic sheets in both members 61 and 62 to enable these two members to be fitted together. The end portions of sheet 67 and 68 are bent back in a returning fashion in an S-shape at 70 such that the two pieces define a groove. However, insulative material is provided between the bent ends of both the inner and outer sheets such that no heat conductive path from inner sheet 67 to outer sheet 68 is provided. Similar S-bends at the ends of sheets 67' and 68' form a tongue on member 62 which fits the groove formed in member 61. Insulation is again provided extending into the groove defined by sheets 67' and 68' and again serves to separate the inner from the outer sheet to avoid a heat conductive path to the outer wall of the oven. Accordingly, by this construction there is provided an effective and cheap method for constructing an oven wall member out of inexpensive and readily available materials while yet maintaining good insulation between the inner and outer metal skin, without a conventional steel framework around which the sheet metal is stretched. This uncommonly light and inexpensive wall construction in the oven of this invention is made possible by the cylindrical shape of the oven. In turn, this cylindrical shape enables construction of a strong sturdy unit which has relatively uniform properties of expansion and contraction with heat, thus resulting in a minimum of distortion.

The tongue-in-groove construction further eliminates all heat conductive paths through the walls thus maintaining the outer wall at an unexpectedly cool temperature. The pressure of a heat path between the inner and outer skin not only would cause heat leakage from the oven and potentially cause a "cold spot" in a portion of the oven but perhaps more importantly such a heat conductive path can potentially result in extreme heating of the outer oven wall with possibility of injury to persons in the area of the oven or damage to articles which are inadvertently brought into contact with the oven.

The wall structure in accordance with this invention need not be of sheet metal sandwich construction but, for example, ovens in accordance with this invention can be constructed of insulative or poorly conductive ceramic material or the like cast to for cylindrical walls. Alternatively, high temperature rigid structural plastic foams or the like could be employed with a metal protective skin on the inner surface facing within the heat insulated zone. In such cases, the outer skin might be obviated if the foam itself contributed sufficient structural integrity.

Illustrated in FIGURE 5, a useful device which may be employed to hold members 61 and 62 together is seen. The device illustrated in FIGURE 5 may be employed to temporarily pull together members 61 and 62 while permanently binding the members as for example with a screw-on cover plate. On the other hand, several devices such as illustrated in FIGURE 5 may be employed to hold together members 61 and 62 such as to provide an oven which is capable of assembly and disassembly. More specifically, with reference to FIGURE 5, bolt 90 is mounted on member 61 while an outwardly extending pin 91 is provided on member 62. Bolt 90 is also eccentrically mounted through cam 93 which is rigidly affixed to the bolt so as to rotate upon rotation of bolt 90. Hook member 94 is provided with a hooked end 95 and a hole 96 which is fitted onto cam 93. Cam 93 is adapted to rotate within the hole 96 in hook member 94. Accordingly, by counterclockwise rotation of bolt 90, the eccentric portion of cam 93 is caused to move to the right as illustrated in FIGURE 5 thus causing hook member 95 to engage pin 91 and draw elements 61 and 62 together.

It will be appreciated that by virtue of the construction of members 61 and 62, there is some resiliency in the tongue-in-groove arrangement provided. Accordingly, it is necessary to provide a very tight fit between these two members. The device illustrated in FIGURE 5 provides sufficient leverage to enable closure of the seal between members 61 and 62. The device of FIGURE 5 may be preferably mounted above and below members 61 and 62 at 121 and 122 to hold these members together. If desired, a more permanent cover plate may then be placed across the seam between the two members and screwed in place using standard sheet metal screws.

Top and bottom closure members 2 and 3 may be also conveniently constructed in a sandwich fashion using two sheets of sheet metal enclosing a layer of insulating material. Of course, other methods of construction of these members may be used as discussed above. With specific reference to FIGURE 3, there is shown in partial section a venting arrangement which can be built into top closure member 2 which provides a method for venting hot gas from the oven upon opening of doors 101 and 102. A lamp or light 124 is mounted in top closure member 2 and serves to illuminate the interior of the oven. It should be noted light 124 is placed proximate the flue tube thus casting illumination down to all shelves through the open gas path proximate the flue tube 11.

It will be noted in FIGURE 1 that doors 100, 101, and 102 are mounted frontally on the oven. The doors do not conform to the curve to the heating zone, and accordingly, as mentioned above, the heating zone is not perfectly cylindrical in the area of doors 101 and 102. The doors may be conveniently hinged from the bottom to open with a downward swing so that they may conveniently serve as support surfaces for items while loading or unloading the oven. Insulated handles 103 and 104 are conveniently provided on each of the doors to enable their use. Since doors 101 and 102 are recessed beneath and inside the venting hood 105, upon opening the doors, a large portion of the hot gas from the oven will rise rapidly into hood 105 and pass to vent 106 from which the hot gas may be conveniently vented with the exhaust from flue tube 11 or in any other desired manner. Hood 105 is integrally built into top closure member 2 as may be seen by reference to FIGURE 3. Except for that space serving as the hood and vent space, closure member 2 is a completely insulated sandwich construction. If desired, a suction fan may be mounted on vent 106 to draw heat upwardly to the hood and through the vent. Vent 106 is also provided with damper 126 to restrict the heat flow as desired. Damper plate 127 is connected by rod 128 to handle 129 protruding through the front of the oven to enable control of vent 106.

The mounting of top closure member 2 on vertical wall member 1 should also be noted. It is preferred that vertical wall member 1 be provided with a peripheral shoulder 110 a spaced distance from the top of the vertical wall member. Accordingly, closure member 2 is joined with vertical wall member 1 by sitting on shoulder 110. Accordingly, no straight line heat seal is provided between these two members in the top region of heated zone 10 where heat leakage is most likely to occur. It is preferred that in the construction, an asbestos gasket or the like 111 and a heat resistant sealing cement be disposed around shoulder 110 to complete the insulative seal between vertical member 1 and top closure member 2.

Frontal facade pieces 115 and 116 shown in FIGURE 3 give the oven a flat frontal appearance and provide space for housing the gas control system, oven thermostats, and the like, as desired. Additional doors at 135 and 136 may be provided to facilitate access to the motor and the like for repairs. It should be noted that although doors 101 and 102 are shown as solid members, these doors may be provided with viewing windows if such is desired.

The novel oven of this invention has been described with reference to the particular embodiments as shown in the drawings. However, it will be obvious to those skilled in the art that the inventive subject matter herein is not restricted to the embodiments set forth in the drawings or specifically discussed above. For example, a novel oven in accordance with this invention can be constructed using other well known insulating wall techniques and need not employ the sheet metal sandwich construction enclosed herein. Other variations and modifications obvious to those skilled in the art can also be made without departing from the instant invention.

What is claimed is:

1. In a baking oven wherein a plurality of rotatable shelves are disposed in a heated zone and wherein hot gas is generated at the lower portion of said heated zone to travel upwardly past said shelves, the combination comprising:
    a rotatable flue tube disposed vertically in said zone for mounting said shelves, said flue tube having inlet ports for gas below the lowermost shelf and adapted to exhaust hot gas from said heated zone; and
    an insulative baffle extending from the outer edges of the lowermost of said rotatable shelves to said flue tube beneath said inlet ports for directing said hot gas upwardly and outwardly around said lowermost shelf and for maintaining said lowermost shelf at substantially the same temperature as the remaining shelves.

2. The oven of claim 1 wherein said insulative baffle comprises a heat reflective layer and a heat insulative layer.

3. The oven of claim 1 wherein the hot gas flow in said oven is upward around the outer periphery of said heated zone and downwardly in the central portion of said zone proximate said flue tube.

4. The oven of claim 1 wherein said heated zone is enclosed by an insulated wall comprising an outer skin of sheet metal material and an inner skin of sheet metal material, with insulation disposed between said inner and said outer skin to provide no heat conductive path between said inner and outer skin.

5. The oven of claim 1 wherein said shelves comprise grill-like support surfaces to permit the passage of hot gases therethrough.

6. A baking oven comprising:
    an insulated enclosure means defining a heat insulated zone;
    means for generating hot gas in the lower portion of said heat insulated zone;
    a rotatable flue tube mounted vertically in said heat insulated zone having gas inlet ports in the lower portion thereof proximate the bottom of said zone and adapted to exhaust hot gas outside said zone;
    means to rotate said flue tube;
    a plurality of shelves mounted on said flue tube, said shelves having means to permit gas flow proximate said flue tube; and
    an insulative baffle extending from the outer edge of the lowermost of said shelves to said flue tube below said inlet ports for directing said hot gas upwardly and outwardly past said lowermost shelf for maintaining said lowermost shelf at substantially the same temperature as the upper shelves.

7. The oven of claim 6 wherein the hot gas travels upwardly proximate the vertical walls of said zone, downwardly proximate said flue tube, and flows into said inlet ports of said flue tube to exhaust.

8. The oven of claim 6 wherein said insulative shield comprises a heat reflective layer and a heat insulative layer.

9. The oven of claim 6 wherein the entirety of said shelves are of grill-like construction to permit passage of hot gases therethrough.

10. The oven of claim 6 including:
   a plurality of doors disposed frontally on said oven to enable access to said shelves; and
   a vent hood disposed above and outwardly from said doors to vent hot gas upwardly upon opening of said doors.

11. The oven of claim 6 wherein said insulated enclosure means comprises:
   a vertically disposed encircling wall defining a substantially cylindrical space, said encircling wall comprising an inner metal skin separated from an outer metal skin by insulation to provide no heat conductive path from said inner to said outer skin.

12. The oven of claim 11 wherein said vertically disposed encircling wall comprises:
   first and second curved portions both comprising an inner metal skin separated from an outer metal skin by insulation, the said outer skin and inner skin on said first curved portion forming a tongued edge on said first curved portion, the said outer skin and inner skin on said second portion forming a grooved edge to receive said tongued edge, and
   means holding said tongue in said groove clamping said first to said second curved portion.

13. The oven of claim 11 wherein said vertical encircling wall is provided with a horizontal shoulder spaced from the top thereof and said insulated enclosure includes a top closure member resting on said shoulder forming a heat seal.

References Cited

UNITED STATES PATENTS

| | | | |
|---|---|---|---|
| 800,588 | 9/1905 | Meyer | 263—26 |
| 1,278,200 | 9/1918 | Osborne | 107—60 |
| 1,786,142 | 12/1930 | Wyman | 107—60 |

WALTER A. SCHEEL, *Primary Examiner.*

JOSEPH R. SHEA, *Assistant Examiner.*

U.S. Cl. X.R.

263—26